United States Patent
Torii (10) Patent No.: US 7,273,322 B1
(45) Date of Patent: Sep. 25, 2007

(54) CONTINUOUS SHEET-PRINTING DEVICE, SYSTEM, METHOD AND STORAGE MEDIUM STORING PROGRAM

(75) Inventor: Takeshi Torii, Kanagawa (JP)

(73) Assignee: Fuji Xerox Co. Ltd., Tokyo (JP)

( * ) Notice: Subject to any disclaimer, the term of this patent is extended or adjusted under 35 U.S.C. 154(b) by 0 days.

(21) Appl. No.: 11/637,706

(22) Filed: Dec. 13, 2006

(30) Foreign Application Priority Data

Jul. 3, 2006 (JP) .............................. 2006-183459

(51) Int. Cl.
*B41J 11/44* (2006.01)

(52) U.S. Cl. ........................... 400/76; 400/61; 400/62; 358/1.12

(58) Field of Classification Search .................. 400/70, 400/76, 61, 62; 358/1.12
See application file for complete search history.

(56) References Cited

U.S. PATENT DOCUMENTS 6,690,477 B2 * 2/2004 Nakagiri et al. ........... 358/1.12

6,789,962 B2 * 9/2004 Matsunaga et al. ........... 400/70

FOREIGN PATENT DOCUMENTS

| JP | A 2000-263891 | 9/2000 |
| JP | A 2001-253144 | 9/2001 |
| JP | A 2004-326544 | 11/2004 |

* cited by examiner

*Primary Examiner*—Minh Chau
(74) *Attorney, Agent, or Firm*—Oliff & Berridge, PLC (57) ABSTRACT

A continuous sheet-printing device including: an input buffer for printing data; a generation section that generates image data from the printing data that is supplied from the input buffer; an output buffer for the generated image data; a printing section that implements printing on continuous sheet in accordance with image data supplied from the output buffer; a determination section that determines, on the basis of a buffering state of the output buffer, whether or not generation of image data by the generation section will be timely for a print timing of that image data at the printing section; and a controller that, when the determination section determines that generation of image data by the generation section will not be timely, controls the printing section such that a predetermined page count of skip page(s) is inserted between printed pages according to the generated image data, is provided.

21 Claims, 9 Drawing Sheets

CONTINUOUS SHEET-PRINTING DEVICE, SYSTEM, METHOD AND STORAGE MEDIUM STORING PROGRAM

BACKGROUND

1. Technical Field

The present invention relates to a continuous sheet-printing device for printing continuous sheet and a system, method and storage medium storing a program thereof, and more particularly relates to a continuous sheet-printing device and system which can continue printing operations even when generation of image data is slower than a printing speed, methods for controlling these, and storage mediums storing programs therefor.

2. Related Art

With printing devices such as continuous sheet-printing devices and the like, due to increases in resolution and complexity of print jobs in recent years, cases may occur in which imaging processing for preparing bitmap data from a print job does not keep up with a printing speed of an IOT (an image output terminal; i.e., an output section which forms an image and outputs the same onto sheet).

Commonly, in order to assure printing quality, a printing device requires a preparation time before printing commences, until various devices structuring the IOT of the printing device have reached regular states. During printing operations, if printing temporarily stops for whatever reason, this preparation procedure is required again, printing productivity is lowered, and a greater burden is applied to the machinery. The faster and bigger the printer, the greater such effects are. In particular, in a color continuous sheet-printing device which conveys continuous sheet with a pinless conveyance mechanism for printing, it is necessary to carry out color registration adjustment after a continuous sheet position has been stabilized. There are also devices in which it is necessary to convey sheet by tens of meters during the preparation procedure.

There are continuous sheet-printing devices which employ structures such that a large-capacity buffer is provided between a processor which performs image processing and the IOT, speed variations are absorbed, and stoppages during printing are prevented. However, designing in this manner with an excess in capability (that is, providing the large-volume buffer) in order to absorb speed variations leads to a great increase in costs. Therefore, a printing device which will be capable of continuing without stopping printing operations during printing, regardless of the volume of a buffer, has been desired.

SUMMARY

One aspect of the present invention is a continuous sheet-printing device including: an input buffer that buffers printing data; a generation section that generates image data on the basis of printing data that is supplied from the input buffer; an output buffer that buffers the generated image data; a printing section that implements printing on continuous sheet in accordance with image data supplied from the output buffer; a determination section that determines, on the basis of a buffering state of the output buffer, whether or not generation of image data by the generation section will be timely for a print timing of that image data at the printing section; and a controller that, when the determination section determines that generation of image data by the generation section will not be timely, controls the printing section such that a predetermined page count of skip page(s) is inserted between printed pages according to the generated image data.

BRIEF DESCRIPTION OF THE DRAWINGS

Exemplary embodiments of the present invention will be described in detail based on the following figures, wherein.

DETAILED DESCRIPTION

Herebelow, exemplary embodiments of the present invention will be described in detail with reference to the drawings.

First Exemplary Embodiment

Figure 1:
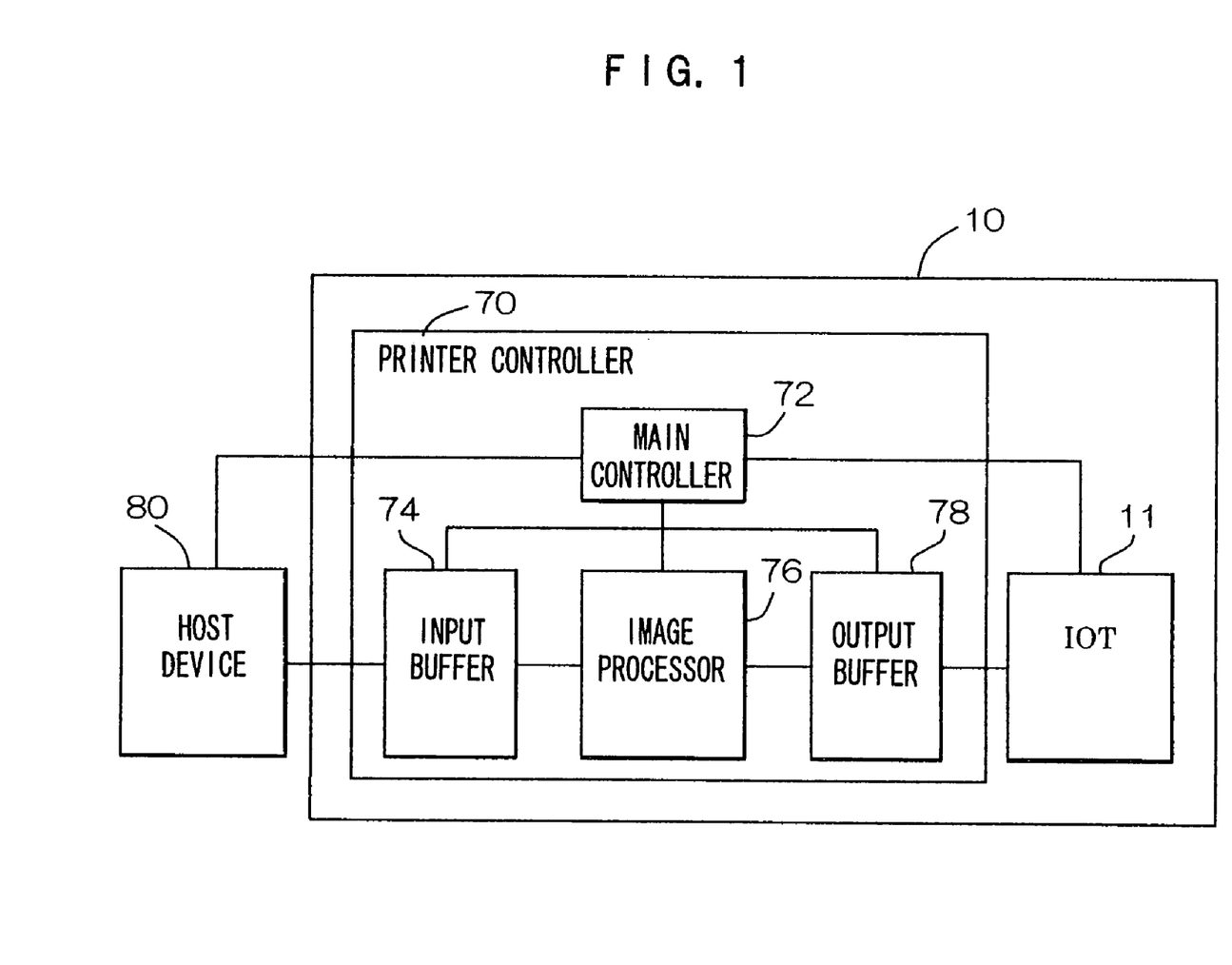
FIG. 1 is a schematic structural diagram of a continuous sheet-printing device relating to first and second exemplary embodiments.

FIG. 1 is a schematic structural diagram of a continuous sheet-printing device 10, relating to a first exemplary embodiment. As shown in FIG. 1, this continuous sheet-printing device 10 is structured to include a printer controller 70 and an IOT (image output terminal) 11.

Figure 2:
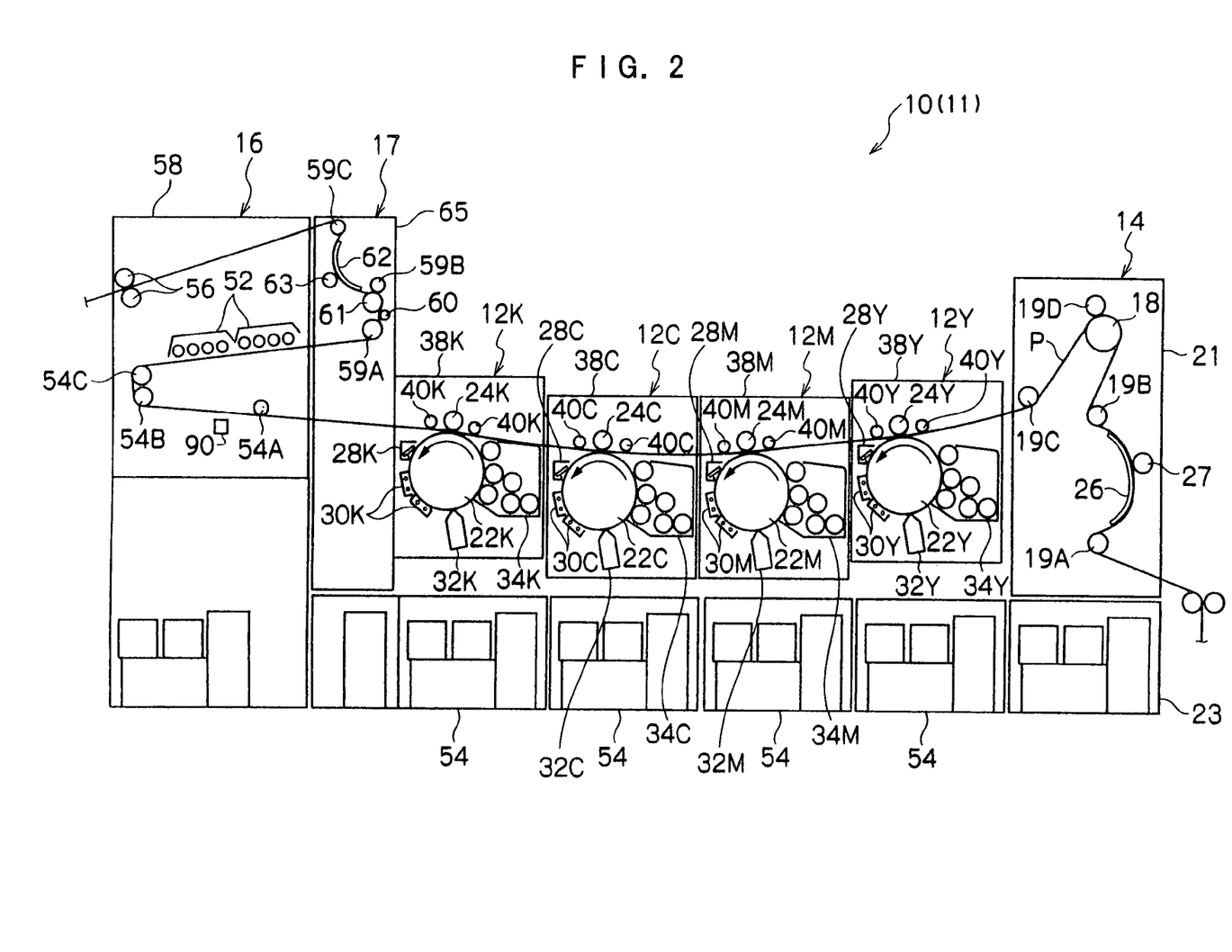
FIG. 2 is a schematic structural diagram of an IOT.

FIG. 2 is a schematic structural diagram of the IOT 11. As shown in FIG. 2, printing sections 12Y, 12M, 12C and 12K (below referred to as printing sections 12Y-K) are arranged in that order from a conveyance direction upstream side. The printing sections 12Y-K sequentially transfer toner images of the colors yellow (Y), magenta (M), cyan (C) and black (K), respectively, to a continuous sheet P, superposing the toner images.

At the conveyance direction upstream side of these printing sections 12Y-K, a sheet conveyance section 14 is provided which conveys the continuous sheet P to the printing sections 12Y-K. At the conveyance direction downstream side of the printing sections 12Y-K, a fixing section 16 and a sheet ejection section 17 are provided. The fixing section 16 fixes the unfixed toner images that have been transferred to the continuous sheet P by the printing sections 12Y-K.

The sheet ejection section 17 ejects the continuous sheet P that has passed through the fixing section 16.

The continuous sheet which is printed by this continuous sheet-printing device 10 may be a long belt-form sheet (paper) at which cutting lines such as perforations or the like or folding lines are formed at respective pages and the pages can be cut apart, or may be a long belt-form sheet which extends continuously without perforations or the like having been formed.

Hereafter, where it is necessary to distinguish between Y, M C and K, descriptions will be given with Y, M, C or K appended to reference numerals, and where there is no need to distinguish between Y, M, C and K, then Y, M, C and K will be omitted.

The sheet conveyance section 14 is equipped with a main driving roller 18 around which the continuous sheet P is wound. The main driving roller 18 is driven by a sheet conveyance motor (not shown), which is a stepper motor, and controls conveyance amounts of the continuous sheet P in accordance with numbers of pulses at the sheet conveyance motor.

As shown in FIG. 2, at the conveyance direction upstream side of the main driving roller 18 of the sheet conveyance section 14, idling rollers 19A and 19B, around which the continuous sheet P is wound, are provided. At the conveyance direction downstream side of the main driving roller 18, an idling roller 19C around which the continuous sheet P is wound is disposed. A further idling roller 19D presses against the main driving roller 18. The idling roller 19D and the main driving roller 18 nip and convey the continuous sheet P.

A conveyance guide 26 and an aligning roller 27 are disposed between the idling roller 19A and the idling roller 19B. At the conveyance guide 26, a 'U'-form curved surface, around which the continuous sheet P is wound, and a side guide (not shown), which guides one end portion of a width direction (a direction intersecting the conveyance direction) of the continuous sheet P, are formed.

A rolling width of the aligning roller 27 is well narrower than each of the idling rollers 19A, 19B, 19C and 19D, and a rotation axis thereof crosses the conveyance direction of the continuous sheet P at an angle. Thus, the aligning roller 27 abuts against one width direction end portion of the continuous sheet P and causes the continuous sheet P to move toward one end side in the width direction. As a result, one width direction end portion of the continuous sheet P abuts against the guide rib of the conveyance guide 26, and skew of the continuous sheet P is corrected.

Herein, the main driving roller 18, the idling rollers 19A, 19B, 19C and 19D, the sheet conveyance motor, the conveyance guide 26 and the aligning roller 27 are supported at a sheet conveyance frame 21 directly or via support members. The sheet conveyance frame 21 in turn is supported at a pedestal 23.

The printing sections 12Y-K are provided with photosensitive bodies 22. Around each photosensitive body 22, a transfer roller 24, a cleaning apparatus 28, an electrostatic charger 30, a print head 32, and a developing apparatus 34 are arranged in this order in a direction of rotation of the photosensitive body 22 (the direction of an arrow in FIG. 2). The printing sections 12Y-K are provided with printing frames 38Y-K, each of which supports the respective photosensitive body 22, cleaning apparatus 28, electrostatic charger 30 and printhead 32. Linking of the neighboring printing frames 38Y-K to one another is implemented by connecting pedestals 54, which support the printing frames 38Y-K to be capable of raising and lowering the printing frames 38Y-K, to one another with nuts and bolts (which illustrations are omitted in the drawing), and positioning and bolting the printing frames 38Y-K to one another via connecting plates (also not shown). The pedestal 54 that supports the printing frame 38Y is connected to the pedestal 23 which supports the sheet conveyance frame 21.

The electrostatic charger 30 charges up the surface of the photosensitive body 22. The printhead 32 exposes the charged surface of the photosensitive body 22 in lines and forms a latent image in accordance with image data received from the printer controller 70.

The developing apparatus 34 is provided with three developing magnet rollers, which are arranged along the axial direction of the photosensitive body 22, a conveyance magnet roller and two stirring screws. The developing apparatus 34 causes toner to adhere on the latent image that has been formed at the photosensitive body 22, forming a toner image. The conveyance magnet roller conveys a two-component toner constituted with a toner and a carrier to the three developing magnet rollers. The stirring screws agitate and charge up the toner and carrier, which are loaded in a developing cartridge, to mix up the toner and carrier homogeneously.

The transfer roller 24 abuts against a top face of the photosensitive body 22, nips the continuous sheet P against the photosensitive body 22, and conveys the continuous sheet P. Here, the toner image that has been formed on the photosensitive body 22 by the developing apparatus 34 is transferred to the continuous sheet P. Two guide rollers 40 are also provided, at the conveyance direction upstream side and downstream side of the transfer roller 24. The guide rollers 40 move vertically at suitable times in accordance with transfer operations.

The cleaning apparatus 28 scrapes off and removes untransferred residual toner that has been left on the surface of the photosensitive body 22 rather than being transferred to the continuous sheet P.

The fixing section 16 is provided with a flash fixing apparatus 52, idling rollers 54A, 54B and 54C and sheet ejection rollers 56. The idling rollers 54A, 54B and 54C, the flash fixing apparatus 52 and the sheet ejection rollers 56 are sequentially arranged in this order in the conveyance direction. Respective two end portions of each thereof, in a direction intersecting the conveyance direction, are supported at a fixing frame 58.

The idling rollers 54A, 54B and 54C are disposed at a back side from the printed side of the continuous sheet P. The idling roller 54C is disposed above the idling roller 54B. Consequently, the continuous sheet P which is wound around the idling rollers 54A, 54B and 54C is inverted between front and back and conveyed with the printed side facing upward.

The flash fixing apparatus 52 is disposed at the printed side of the continuous sheet P which is being conveyed with the printed side facing upward, and illuminates the printed side of the continuous sheet P with infrared light. As a result, the unfixed toner on the continuous sheet P is heated and melted, and thereafter solidifies and is fixed to the continuous sheet P.

Hence, the sheet ejection rollers 56 eject a toner-fixed region of the continuous sheet P from the continuous sheet-printing device 10. However, the continuous sheet P which has passed the flash fixing apparatus 52 is temporarily ejected from the fixing section 16 and passes through the sheet ejection section 17, and then returns to the fixing section 16 to be ejected by the sheet ejection rollers 56.

The fixing section 16 is provided with a detection sensor 90 which, when a pattern for printing quality verification is printed on the continuous sheet P, reads density, positional offsets and the like of the pattern. In accordance with detection results from the detection sensor 90, density, positional offsets of the colors C, M, Y and K and suchlike are adjusted.

In the sheet ejection section 17, an idling roller 59A, a tensioning roller 60, a sub-driving roller 61, an idling roller 59B, a conveyance guide 62, an aligning roller 63 and an idling roller 59C are arranged in this order in the conveyance direction. Respective two end portions thereof, in the direction intersecting the conveyance direction, are supported at an ejection frame 65 directly or via support members. This ejection frame 65 is connected with the printing frame 38K and the fixing frame 58.

The sub-driving roller 61 is disposed above the idling roller 59A. The continuous sheet P that is wound around the idling roller 59A and the sub-driving roller 61 switches direction and is conveyed upward. The idling roller 59B presses against the sub-driving roller 61. The idling roller 59B rotates passively with rotation of the sub-driving roller 61, and nips and conveys the continuous sheet P together with the sub-driving roller 61.

The tensioning roller 60 is disposed between the idling roller 59A and the sub-driving roller 61. The continuous sheet P is meanderingly conveyed between the idling roller 59A and the tensioning roller 60 and between the tensioning roller 60 and the sub-driving roller 61.

Two axial direction end portions of the tensioning roller 60 are swingably supported by an arm (not shown). This arm is urged toward the continuous sheet P by an urging device such as a spring or the like (not shown), and urges the tensioning roller 60 against the continuous sheet P. As a result, tension is applied to the continuous sheet P.

A position of the arm is detected by a sensor (not shown). A frequency of rotation of the sub-driving roller 61 is controlled such that the position of the arm is continuously located at a constant position.

The conveyance guide 62 and the aligning roller 63 are disposed at the conveyance direction downstream side of the sub-driving roller 61. The conveyance guide 62 and aligning roller 63 correct skew of the continuous sheet P with a structure similar to the conveyance guide 26 and aligning roller 27 disposed at the sheet conveyance section 14.

The idling roller 59C is disposed at the conveyance direction downstream side of the conveyance guide 62. The continuous sheet P is wound around this idling roller 59C and switches to a direction toward the sheet ejection rollers 56, which eject the continuous sheet P toward a subsequent post-processing device (not shown).

The IOT 11 which is structured thus forms and outputs images on the continuous sheet P on the basis of image data supplied from the printer controller 70. The printer controller 70 receives a print job including printing data in the PDL format or the like from a host device 80, generates image data from the printing data of the received print job, supplies the image data to the IOT 11, and controls printing operations of the IOT 11.

As shown in FIG. 1, the printer controller 70 is provided with an input buffer 74, an image processor 76 and an output buffer 78. The input buffer 74 buffers respective print data of respective pages of a print job received from the host device 80. The image processor 76 generates image data in a bitmap format for each of the colors Y, M, C and K from the printing data buffered in the input buffer 74. The output buffer 78 buffers image data received from the image processor 76, and outputs the image data to the IOT 11 with predetermined timings.

The printer controller 70 is also provided with a main controller 72, which is structured to include a CPU, ROM and RAM. The main controller 72, by executing a program stored in the ROM, executes processes for receiving printing data from the host device 80 and buffering the image data in the input buffer 74, and for reading image data from the output buffer 78 and outputting the image data to the IOT 11. The main controller 72 also implements control of printing operations of the IOT 11.

Figure 3:
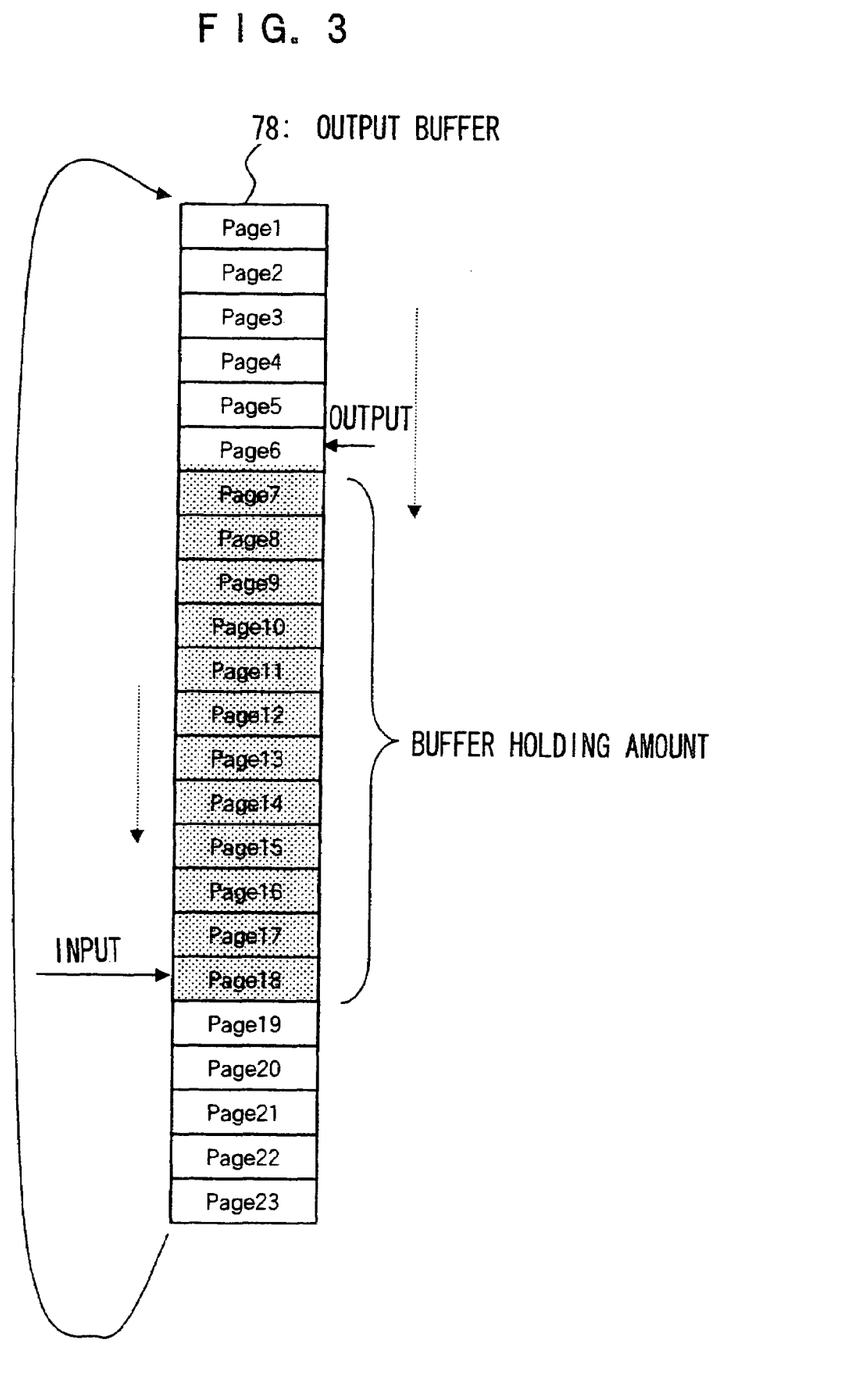
FIG. 3 is a diagram showing an example of a state of buffering of image data in an output buffer.

FIG. 3 is a diagram showing an example of a state of buffering of image data in the output buffer 78. The output buffer 78 is a buffer implemented with a FIFO structure which successively buffers image data for a sequence of printing pages, and outputs the image data successively, from the image data that was buffered first. This output buffer 78 has a ring-form data structure, and can be treated as a buffer region of effectively infinite length. For example, as shown in FIG. 3, at a point in time at which output of image data of a sixth page to the IOT 11 has finished and image data of an eighteenth page has been received from the image processor 76 and stored, the output buffer 78 holds image data corresponding to twelve pages, which is the shaded region in the Figure. Herebelow, in order to simplify explanations, an amount of the image data held by the output buffer 78 (the buffer holding amount) will be indicated by a number of pages rather than a data size.

When image data is generated by the image processor 76, this image data is buffered in the output buffer 78. However, if a printing speed of the IOT 11 is fast, the generation of image data may not be in good time for print timings at the IOT 11 according to that image data. In such a case, in a conventional printing apparatus, conveyance of the continuous sheet P is stopped and printing operations are suspended until the image data is generated. However, this both reduces printing productivity and causes large mechanical loads. Accordingly, in this continuous sheet-printing device 10, it is pre-emptively determined, on the basis of states of buffering of the output buffer 78, whether or not the generation of image data will be timely (i.e., ready in time) for print timings of the IOT 11. When it is determined that the generation will not be timely, the IOT 11 is controlled so as to insert a predetermined page count of skip pages of blank sheet, during printing, such that printing operations of the IOT 11 will not stop. Thus, time can be gained for generating the image data, and stoppages of printing operations of the IOT 11 during printing can be avoided.

Now, with reference to FIGS. 4 and 5, printing control processing which is carried out by the main controller 72 of the printer controller 70 will be described.

Figure 4:
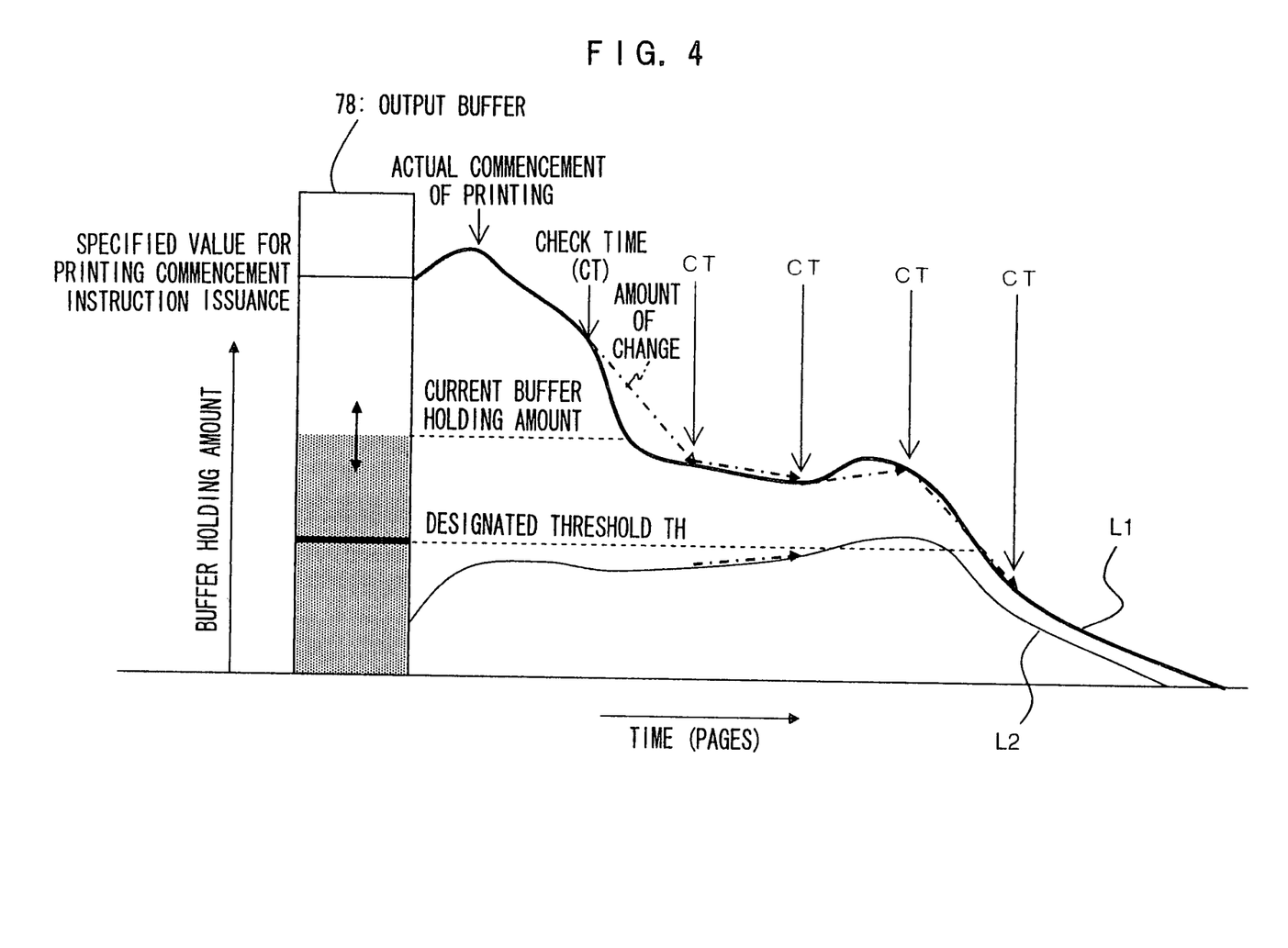
FIG. 4 is a diagram showing an example of variations of buffer holding amounts of the output buffer over a period in which printing occurs (in this case, a printing speed of the IOT is substantially constant, so a period in which printing occurs is substantially proportional to a number of printed pages)

FIG. 4 is a diagram showing an example of variations of buffer holding amounts of the output buffer 78 over a period in which printing occurs (in this case, the printing speed of the IOT 11 is substantially constant, so a period in which printing occurs is substantially proportional to a number of printed pages).

In FIG. 4, the thick line L1 shows states of changes of the buffer holding amount when printing in a spooling mode. The thin line L2 shows states of changes of the buffer holding amount when printing in a streaming mode.

The spooling mode is a printing mode which issues a printing commencement instruction after image data has been accumulated at the output buffer 78 to exceed a specified value for printing commencement instruction issuance. The streaming mode is a printing mode which issues a printing commencement instruction immediately, regardless of the buffer holding amount of the output buffer 78. The streaming mode is used for jobs with light processing loads and can make printing commencement for a first page quicker.

When printing in either mode, each time image data of a pre-specified number of pages is buffered (registered) to the output buffer 78, the state of buffering of the output buffer 78 at that time is checked (the check times in FIG. 4), and it is determined whether or not generation of the image data will be timely for a print timing of the IOT 11.

In the exemplary embodiment, if the buffer holding amount falls below a pre-specified designated threshold TH and an amount of change in the buffer holding amount of the output buffer between a previous check time and the current check time is negative, then the IOT 11 is controlled so as to insert (a) skip page(s). Herein, the amount of change is checked in order to support the streaming mode, which commences printing regardless of whether or not the amount has fallen below the designated threshold TH.

The designated threshold TH is a threshold value which is employed for determining whether or not generation of image data will be timely for a print timing of the IOT 11. For the designated threshold value, an optimal value corresponding to the apparatus can be calculated on the basis of experimental results when prior tests are carried out, printing speeds of the IOT 11, and suchlike.

Figure 5:
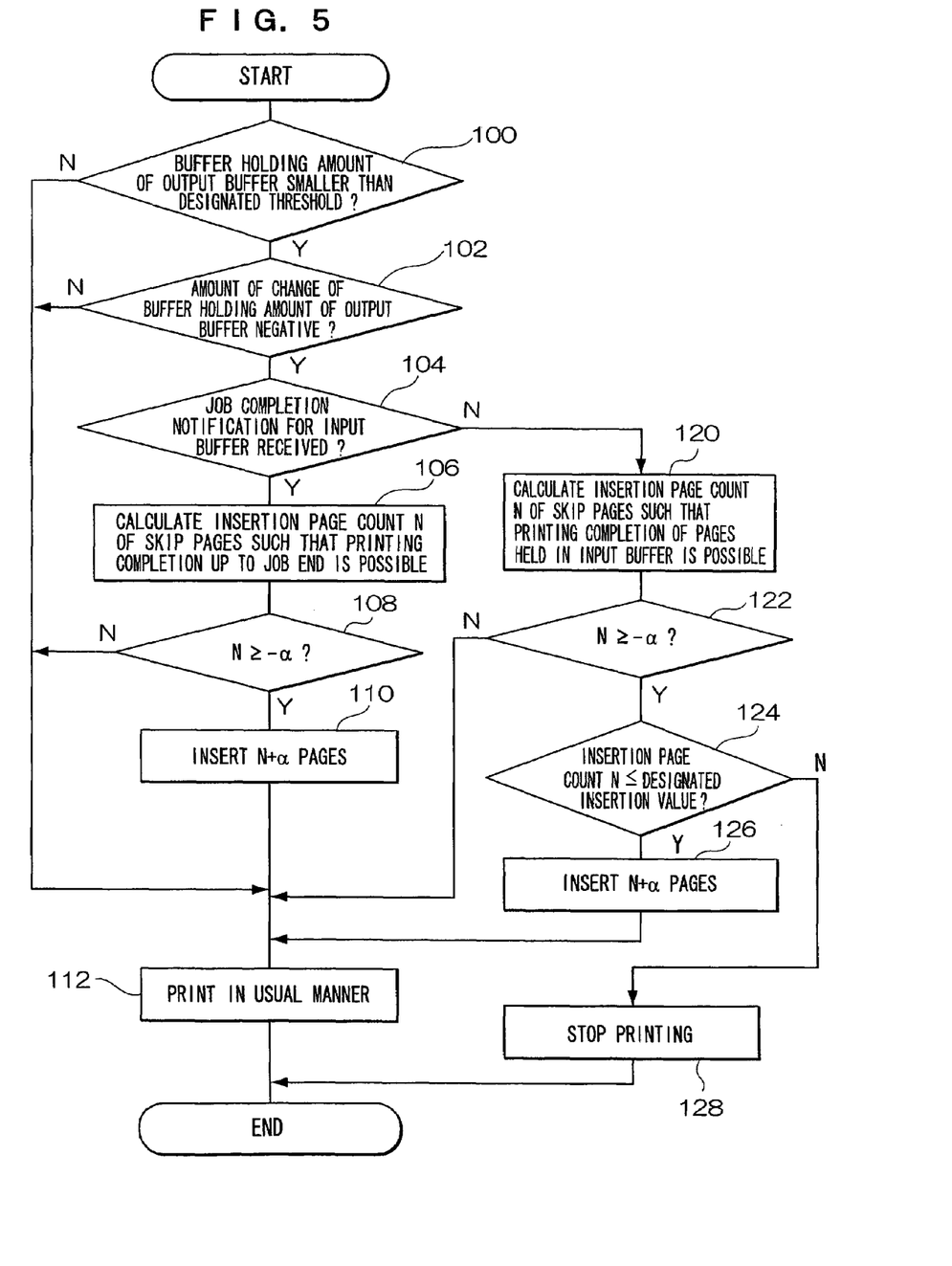
FIG. 5 is a flowchart showing a processing routine of a printing control process which a main controller of a printer controller executes.

FIG. 5 is a flowchart showing a processing routine of a printing control process which the main controller executes. This processing is executed each time a check time is reached, in both the spooling mode and the streaming mode. The flow of the processing corresponds to both the spooling mode and the streaming mode. Herein, a check time is set to be reached each time image data for each of the colors Y, M, C and K is registered (buffered) to the output buffer 78 in an amount corresponding to ten pages.

In step 100, it is determined whether or not the buffer holding region of the output buffer 78 is smaller than the designated threshold TH. If the buffer holding region of the output buffer 78 is determined to be smaller than the designated threshold TH, then in step 102, an amount of change of the buffer holding region of the output buffer between a previous check time and the current check time is calculated, and it is determined whether or not the calculated amount of change is negative. If the calculated amount of change is determined to be negative, it can be determined that generation of image data at the image processor 76 will not be timely for a print timing of that image data at the IOT 11, and the routine advances to step 104.

In step 104, it is determined whether or not a job completion notification, indicating that all printing data of a print job has been inputted to the input buffer 74, has been received. If a job completion notification has been received, it can be determined that no further printing data will be inputted to the input buffer 74. If it is determined in step 104 that a job completion notification has been received, then in step 106, a number of insertion pages N of skip pages, such that completion of printing will be possible without stopping printing operations before the end of the print job, is calculated.

For the calculation of the insertion page count N, firstly, a registration rate Vr of image data from the image processor 76 into the output buffer 78 is found. Herein, the registration rate Vr is calculated as described below.

A duration from the previous check time to the current check time is divided by a number of pages of image data that has been registered to the output buffer 78 in that duration, and how long a registration period for one page lasts is calculated. The registration period for one page which is calculated in this manner serves as the registration rate Vr. The registration rate Vr will vary in accordance with printing data.

Then, the insertion page count N is found by the following equation, in which a printing rate is Vp, a number of pages of printing data currently buffered in the input buffer 74 is Pi, and a number of pages of image data currently buffered in the output buffer 78 (the buffer holding amount) is Po.

$$N = SEIL\{Pi \times (Vr - Vp) \div Vp - Po\} \qquad \text{[Equation 1]}$$

Here, the printing rate Vp is a printing duration for one page of image data. The printing rate Vp of the IOT 11 is substantially constant, and is specified beforehand. SEIL is a rounding-up function for making N an integer.

For example, in a case in which printing data corresponding to 1,000 pages has been buffered at the input buffer 74 and the registration rate is 10% slower than the printing speed, the buffer holding amount of the output buffer 78 will be smaller by 100 pages over 1,000 pages (the number of pages calculated from Pi×(Vr−Vp) Vp of equation 1). If the current buffer holding amount Po of the output buffer 78 is 60 pages, the insertion page count of skip pages can be calculated to be 100−60=40 pages.

In step 108, it is determined whether or not the calculated insertion page count N is equal to or greater than −α. α is a pre-specified value of a number of pages. For example, if the number of pages of printing data that has been buffered at the input buffer 74 is small, then the calculated insertion page count N may be less than −α. In such a case, even if the registration rate slows, it will be possible to generate image data up to the final printing data of the print job while printing the image data that is buffered in the output buffer 78. Therefore, printing operations can be continued until the end without the printing operations being stopped during printing of the print job. In such a case, there is no need to insert skip pages. Accordingly, if it is determined in step 108 that the calculated insertion page count N is less than −α, the routine advances to step 112 and the IOT 11 is controlled so as to continue printing operations in accordance with the image data in a usual (normal) manner.

Figure 6:
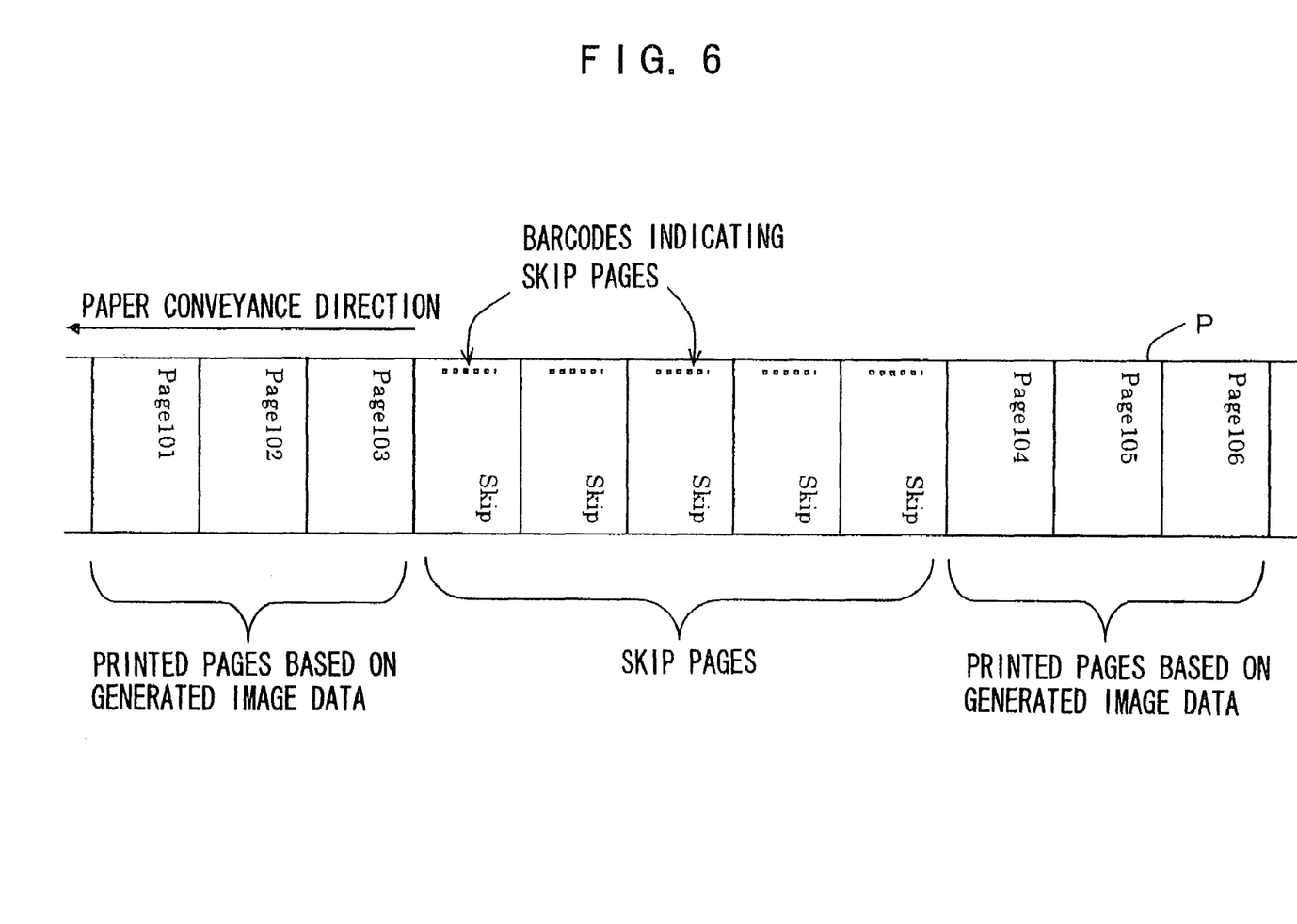
FIG. 6 is a diagram showing a state in which skip pages have been inserted at continuous sheet between printed pages based on image data.

If it is determined in step 108 that the calculated insertion page count N is greater than or equal to −α, then in step 110, as shown in FIG. 6, the IOT 11 is controlled such that skip pages are inserted in the amount of N+α pages, between printed pages based on the image data that is outputted from the output buffer 78 to the IOT 11.

It is possible to control such that skip pages are inserted to just the calculated insertion page count N. However, herein, in consideration of variations in the registration rate of image data to the output buffer 78, the pre-specified value α is added to provide a surplus. During a period of insertion of skip pages by the IOT 11, the image processor 76 generates image data and continues to output the image data to the output buffer 78.

As shown in FIG. 6, a barcode indicating the presence of a skip page may be printed at each of the skip pages. Hence, the skip pages can be easily identified by a post-processing apparatus.

An insufficiency of the buffer holding region of the output buffer 78 can be made up for by inserting skip pages in this manner, and printing operations can be continued without stopping sheet conveyance and suspending printing operations partway through. After the insertion of the skip pages, the routine advances to step 112, and the IOT 11 is controlled so as to continue implementing printing in accordance with the image data in the usual manner.

On the other hand, if it is determined in step 104 that a job completion notification has not been received, the routine advances to step 120. In step 120, an insertion page count of skip pages, such that completion of printing for all printing data currently buffered in the input buffer 74 will be possible without printing operations stopping, is calculated. A method for calculation of the insertion page count of skip pages is similar to that described above, so will not be described.

In a next step 122, it is determined whether or not the calculated insertion page count N is greater than $-\alpha$. If it is determined that the calculated insertion page count N is equal to or less than $-\alpha$, the routine advances to step 112. In step 112, the IOT 11 is controlled so as to continue printing operations in accordance with the image data in the usual manner.

On the other hand, if it is determined in step 122 that the calculated insertion page count N is greater than or equal to $-\alpha$, then in step 124, it is determined whether or not the calculated insertion page count N is equal to or less than a designated insertion value. If the calculated insertion page count N is less than or equal to the designated insertion value, the routine advances to step 126. In step 126, the IOT 11 is controlled such that skip pages are inserted in the amount of $N+\alpha$ pages, between the printed pages according to the image data that is outputted from the output buffer 78 to the IOT 11. After the insertion of the skip pages, the routine advances to step 112 and the IOT 11 is controlled so as to continue implementing printing in accordance with the image data in the usual manner.

However, if it is determined in step 124 that the calculated insertion page count N is greater than the designated insertion value, the routine advances to step 128, conveyance of the continuous sheet P is stopped and printing operations of the IOT 11 are stopped. This is because, in a case in which the insertion page count is excessively large, wastage of sheet will increase and desirable printing results will not be provided. It is also possible that some sort of malfunction could occur. Accordingly, printing is stopped in such cases.

Anyway, if it is determined in step 100 that the buffer holding amount of the output buffer 78 is equal to or greater than the designated threshold TH, or if it is determined in step 102 that the amount of change of the buffer holding amount of the output buffer 78 is positive or zero, then it is determined that generation of image data by the image processor 76 will be timely for print timings of that image data by the IOT 11, and the routine advances to step 112. In step 112, the IOT 11 is controlled so as to continue printing operations in accordance with the image data in the usual manner.

As has been described above, in this continuous sheet-printing device 10, it is determined whether or not generation of image data by the image processor 76 will be in time for timings of printing of that image data at the IOT 11, on the basis of buffering states of the output buffer (here, both buffer holding amounts and amounts of change of the buffer holding amounts over predetermined time periods). When it is determined that image data will not be timely, the IOT 11 is controlled such that a predetermined page count of skip pages are inserted between printed pages based on the image data generated by the image processor 76. Therefore, printing operations can be continued without sheet conveyance stopping and printing operations being suspended partway through.

In the exemplary embodiment, one of the determination standards for judging whether or not generation of image data will be timely for print timings of that image data is determining whether or not an amount of change in the buffer holding amount of the output buffer 78 between a previous check time and a current check time is negative. However, the amount of change being negative is equivalent in meaning to the registration rate of image data from the image processor 76 into the output buffer 78 being slower than the printing speed of the IOT 11 over that period. Therefore, instead of the amount of change of the buffer holding amount over the period, whether or not the registration rate of the image data is slower than the printing speed may be determined.

Furthermore, the amount of change of the buffer holding amount of the output buffer 78 between a previous check time and the current check time being negative is equivalent in meaning to an average rate of decrease of the buffer holding amount over that period being greater than zero. Therefore, instead of the amount of change of the buffer holding amount over the period, an average rate of decrease may be calculated for the determination.

Further, in the exemplary embodiment described above, it is determined whether or not generation of image data by the image processor 76 will be timely for print timings according to that image data at the IOT 11 by the same determination standards, regardless of whether the printing mode is the streaming mode or the spooling mode. However, the determination standard may differ in accordance with the printing mode. For example, the value of the designated threshold TH may be made different between the streaming mode and the spooling mode.

Further, in the exemplary embodiment described above, it is determined that the generation will not be timely for the print timing when the amount of change of the buffer holding amount over the predetermined period is negative. However, it could be determined that the generation will not be timely for the print timing when the amount of change is negative and the magnitude thereof is at least a predetermined value.

Further, in the exemplary embodiment described above, it is determined whether or not the generation of image data by the image processor 76 will be timely for the print timing according to that image data at the IOT 11 on the basis of both the buffer holding amount and the amount of change of the buffer holding amount over the predetermined period. However, the present invention is not limited thus. For example, in the spooling mode, the determination may be based only on a comparison result from comparing the buffer holding amount with the designated threshold TH, without referring to the amount of change of the buffer holding amount. Furthermore, in the streaming mode, the determination may be based only on the amount of change of the buffer holding amount.

Further, in the exemplary embodiment described above, for the skip pages, blank pages are simply inserted or barcodes indicating the skip pages are printed. However, the present invention is not limited thus. For example, a pattern for printing quality verification could be printed at the skip pages. Hence, the pattern could be detected with the detection sensor 90 and density corrections, positional offset corrections and the like implemented.

Further, in the exemplary embodiment described above, the continuous sheet-printing device 10 that has been described is capable of color printing, in which image data is generated and printed for each of the colors Y, M, C and K. However, the present invention is not limited thus, and may be applied to continuous sheet-printing devices which are capable only of black-and-white printing.

Second Exemplary Embodiment

Figure 7:
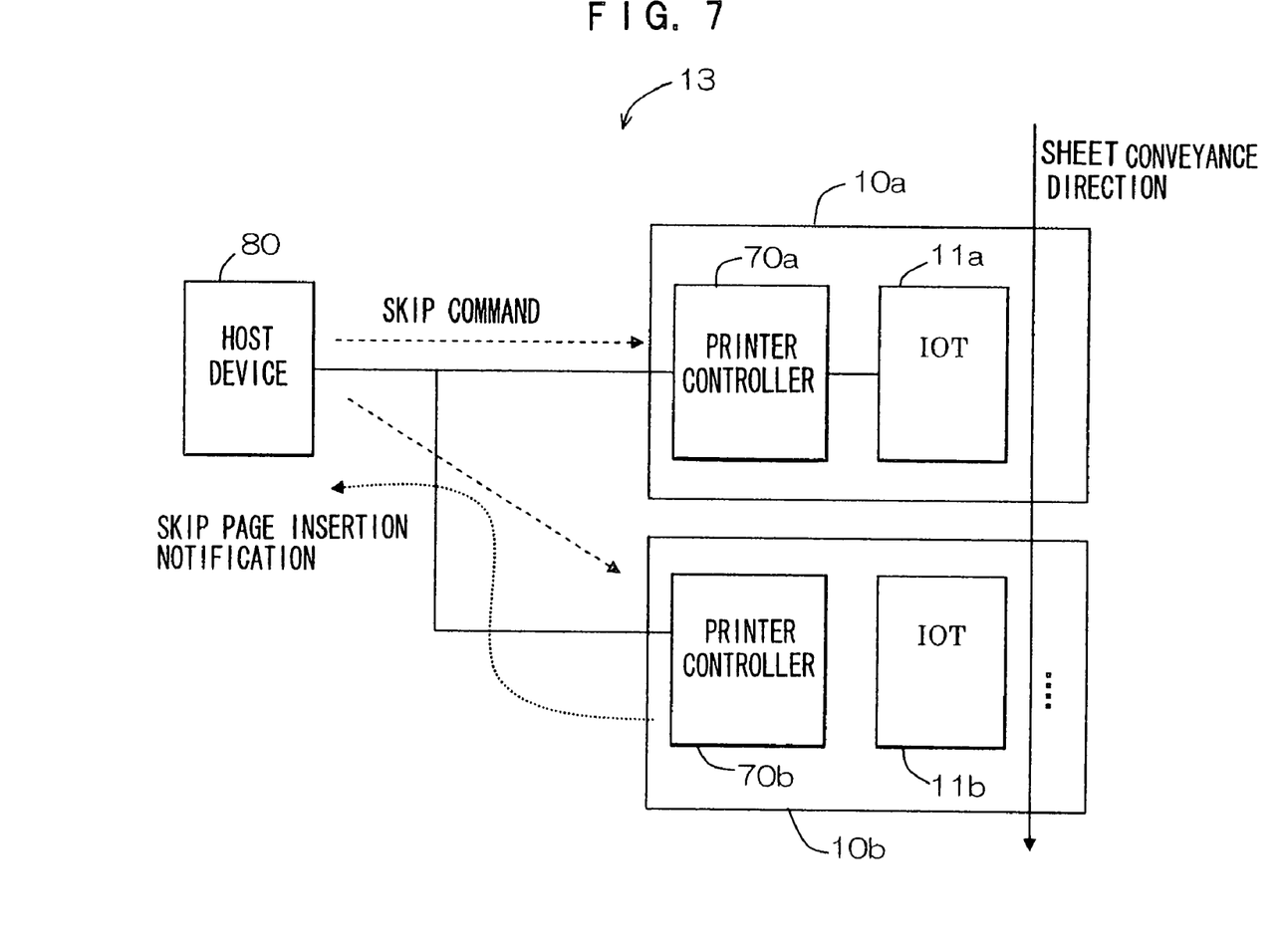
FIG. 7 is a schematic structural diagram of a continuous sheet-printing system relating to the second exemplary embodiment.

FIG. 7 is a schematic structural diagram of a continuous sheet-printing system relating to the second exemplary embodiment. In this continuous sheet-printing system 13, a continuous sheet-printing device 10a, which prints on a front side of continuous sheet P, and a continuous sheet-printing device 10b, which prints on a back side of the continuous sheet P, are arranged in tandem (tandem arrangement), that is, arranged to be connected in series with one another. Structures of the continuous sheet-printing devices 10a and 10b are the same as the continuous sheet-printing device 10 of the first exemplary embodiment, so will not be described here. However, herebelow, the character 'a' will be appended to reference numerals indicating structural elements of the first stage continuous sheet-printing device 10a, and the character 'b' will be appended to reference numerals indicating structural elements of the following stage continuous sheet-printing device 10b, thereby distinguishing the two in the descriptions.

Figure 8:
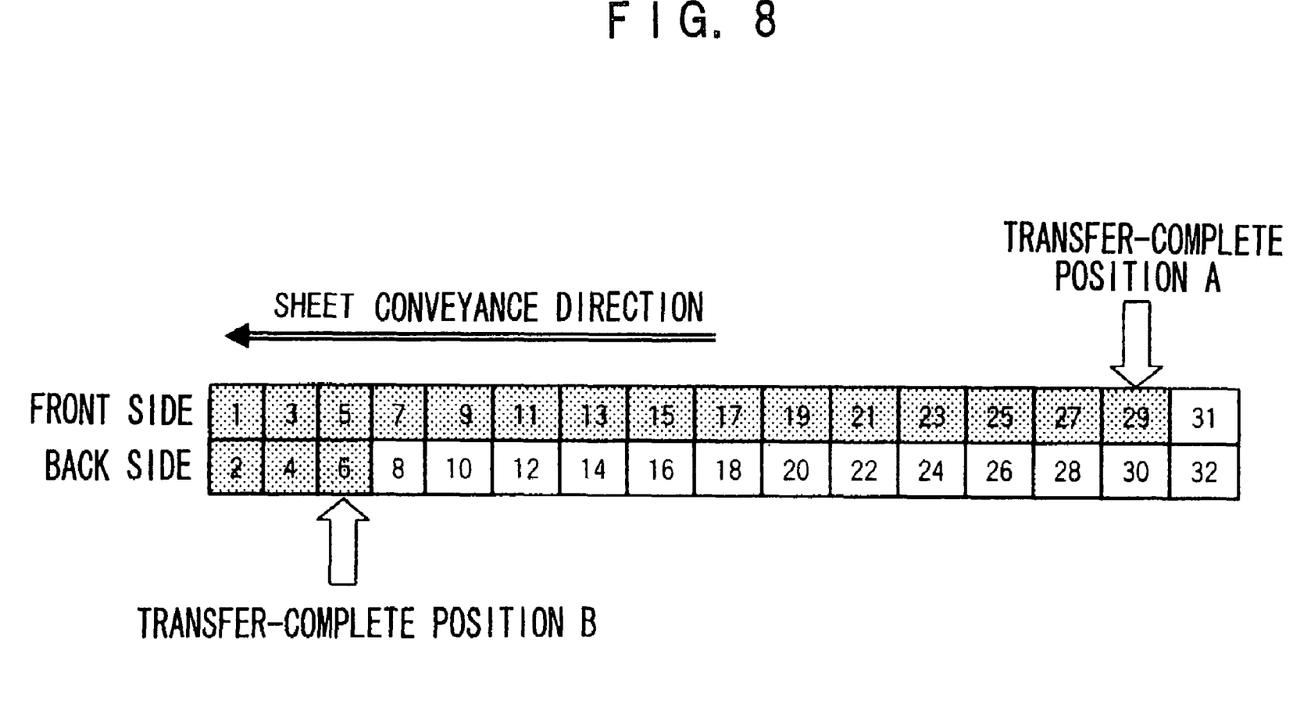
FIG. 8 is a diagram showing a state of printing at a time of printing on a front side and a back side of continuous sheet with two continuous sheet-printing devices, which are arranged in tandem in the second exemplary embodiment.

In this continuous sheet-printing system 13, as shown in FIG. 8, front side pages-page 1, page 3, page 5, etc.—are printed by the first stage continuous sheet-printing device 10a on the front side of the continuous sheet P, and then back side pages-page 2, page 4, page 6, etc.—are printed by the following stage continuous sheet-printing device 10b on the back side. The shaded pages in FIG. 8 represent pages for which transfer is complete (or pages for which printing is complete).

Printer controllers 70a and 70b of the continuous sheet-printing devices 10a and 10b are connected to the host device 80. The host device 80 generates print jobs including image data and supplies the image data to the printer controllers 70a and 70b of the continuous sheet-printing devices 10a and 10b at suitable times. In addition, the host device 80 performs skip page insertion control processing when the host device 80 receives a skip page insertion notification from either one of the continuous sheet-printing devices 10a and 10b, which informs the host device 80 that generation of image data will not be timely for a print timing and that skip pages will be inserted. This processing transmits a skip command to cause insertion of skip pages at the other of the continuous sheet-printing devices, at a location matching the skip page insertion location of the one of the continuous sheet-printing devices.

This skip page insertion control processing will be more specifically described with reference to FIGS. 8 and 9.

At each of the continuous sheet-printing devices 10a and 10b, the processing routine of the print control processing (see FIG. 5) described for the first exemplary embodiment is executed each time a check time is reached. However, in the exemplary embodiment, in a step 111 or a step 127 after the skip page insertion processing of the earlier-described step 110 or step 126, a skip page insertion position and skip page insertion page count (i.e., the skip page insertion notification) are notified to the host device 80.

Figure 9:
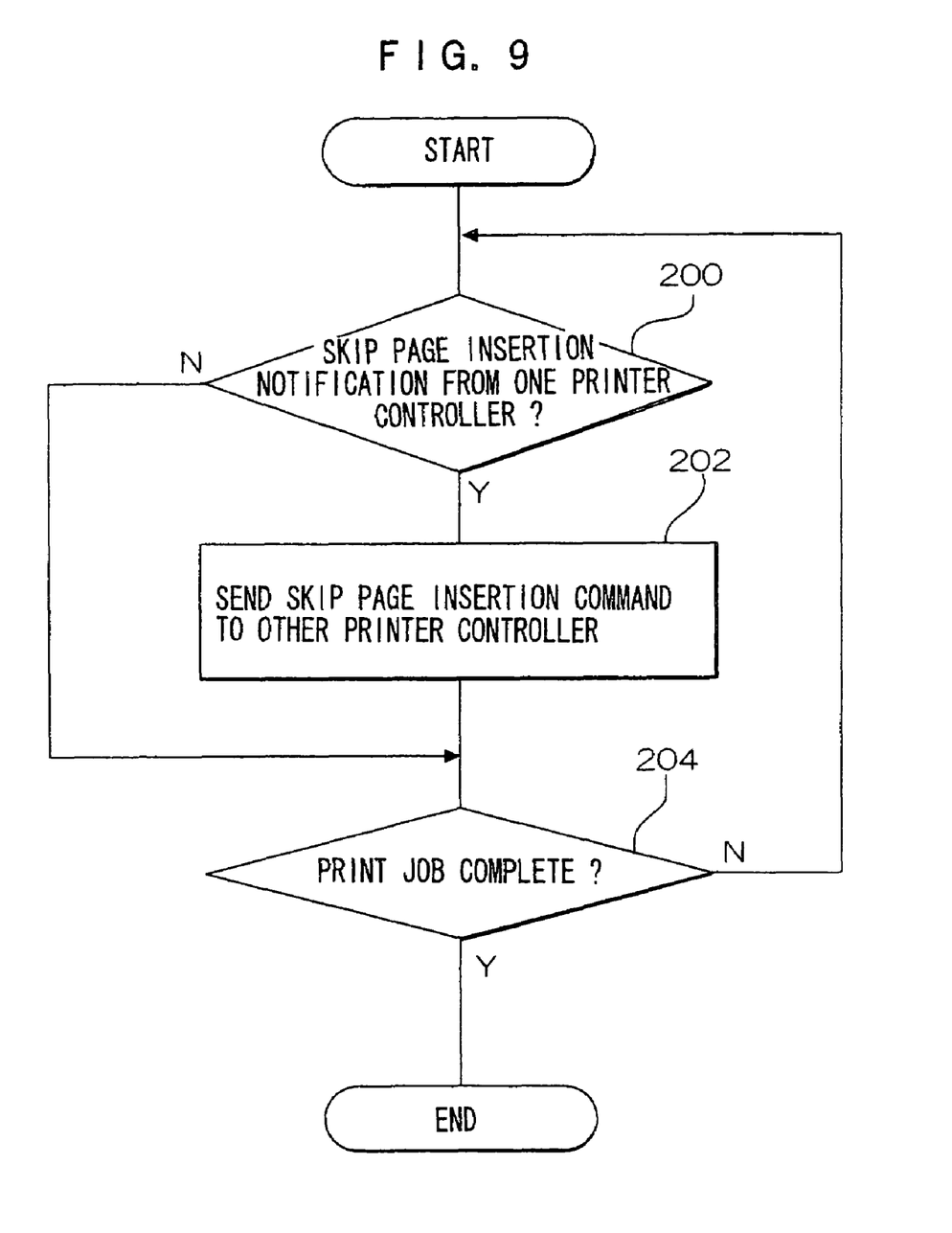
FIG. 9 is a flowchart showing flow of a skip page insertion control processing routine which is carried out by a host device of the second exemplary embodiment.

FIG. 9 is a flowchart showing flow of the skip page insertion control processing routine which is carried out by the host device 80 of the exemplary embodiment. This processing routine is commenced when print jobs are generated and issued to the continuous sheet-printing devices 10a and 10b.

In step 200, it is determined whether or not a skip page insertion notification has been received from either one of the printer controllers 70a and 70b of the continuous sheet-printing devices 10a and 10b. Then, if it is determined that a skip page insertion notification has been received, the routine advances to step 202, and a skip command for causing the insertion of skip pages is sent to the other printer controller. In this command, a skip page insertion position and an insertion page count are specified. Accordingly, at the other of the continuous sheet-printing devices 10a and 10b receiving the command, skip pages of the specified insertion page count are inserted in accordance with the command, at the specified skip page insertion position.

With this command, it is possible to cause skip pages to be inserted at the other continuous sheet-printing device at portions matching portions at which skip pages are inserted by the one continuous sheet-printing device.

On the other hand, if it is determined in step 200 that no skip page insertion notification has been received, the routine advances to step 204 without performing the processing of step 202.

In step 204, it is determined whether or not printing of printed pages of the print jobs has been completely finished. Here, if it is determined that printing of printed pages of the print jobs have has not completely finished, the routine returns to step 200. Then, when it is determined that printing of printed pages of the print jobs has completely finished, the present processing routine ends.

Now, print timings by the continuous sheet-printing device 10a and print timings by the continuous sheet-printing device 10b that correspond to matching portions of the continuous sheet P are offset to the extent of a separation distance between a photosensitive body of the continuous sheet-printing device 10a and a photosensitive body of the continuous sheet-printing device 10b. Thus, as shown in FIG. 8, a transfer-complete position A of the continuous sheet P by the continuous sheet-printing device 10a and a transfer complete position B of the continuous sheet P by the continuous sheet-printing device 10b are offset by an amount corresponding to a predetermined number of pages.

For example, when the first stage continuous sheet-printing device 10a has completed printing of page 29, the following stage continuous sheet-printing device 10b has completed printing of page 6 at the back side of the page at which page 5 was printed. Therefore, if generation of image data will not be timely for a print timing at the first stage continuous sheet-printing device 10a and a skip page is inserted between the printed pages of page 29 and page 31, the following stage continuous sheet-printing device 10b will, having printed as usual up to page 30, similarly insert a skip page between the printed pages of page 30 and page 32.

Conversely, if it were determined that generation of image data would not be timely for a print timing at the following stage continuous sheet-printing device 10b and insertion of a skip page were immediately attempted, there would be a state in which a number of subsequent pages had already been printed by the first stage continuous sheet-printing device 10a. Thus, it is not possible to immediately insert a skip page at the following stage continuous sheet-printing device 10b. At such a time, a skip page will be inserted after printing of the back side has been completed up to a page for which printing by the first stage continuous sheet-printing device 10a has already been completed.

Therefore, at the following stage continuous sheet-printing device 10b, it is necessary to determine whether or not generation of image data will be timely for print timings well beforehand. Accordingly, for the following stage continuous sheet-printing device 10b, the designated threshold TH that is employed by the following stage continuous sheet-printing device 10b may be larger than that for the first stage continuous sheet-printing device 10a. Hence, skip pages can be inserted by the following stage continuous sheet-printing device 10b with time to spare. That is, when it is determined by the following stage continuous sheet-printing device 10b that the generation will not be timely, skip pages can be inserted after printing in the usual manner for a number of prior pages for which printing had already been completed at the first stage continuous sheet-printing device 10a.

Furthermore, the check times may be made different between the first stage continuous sheet-printing device 10a and the following stage continuous sheet-printing device 10b. For example, if the check times are set to arrive at shorter intervals for the following stage continuous sheet-printing device 10b, skip pages can be inserted with time to spare.

Thus, in the continuous sheet-printing system with plural continuous sheet-printing devices in tandem, a determination condition, determination timing and the like for determining whether or not generation will be timely for print timings can be suitably made different for the respective devices. Hence, skip pages can be inserted at optimal timings.

For the exemplary embodiment described above, an example has been described in which, when the host device 80 receives a skip page insertion notification from either one of the continuous sheet-printing devices 10a and 10b, the host device 80 sends a skip command to the other continuous sheet-printing device. However, the present invention is not limited thus.

For example, when the first stage continuous sheet-printing device 10a determines that generation of image data will not be timely for a print timing and a skip page is inserted by the first stage continuous sheet-printing device 10a, a skip mark may be printed such that an insertion position and an insertion page count can be identified therefrom. Then, at the following stage continuous sheet-printing device 10b, this skip mark is identified by a sensor or the like additionally provided at the sheet conveyance section 14b. Hence, a skip page can be inserted at the back side at the same location as at the front side. In such a case, skip pages can be inserted without commands for insertion of skip pages being sent from the host device 80 to the following stage continuous sheet-printing device 10b.

In a system which inserts skip pages in this manner, when it is determined that generation of image data will not be timely for a print timing by the following stage continuous sheet-printing device 10b rather than the first stage continuous sheet-printing device 10a, processing may be performed as follows.

Firstly, a skip page insertion notification is sent from the following stage continuous sheet-printing device 10b to the host device 80. The host device 80 receives this notification and sends a skip command to the first stage continuous sheet-printing device 10a. Hence, in the same manner as described above, a skip page can be inserted by the first stage continuous sheet-printing device 10a and a skip mark printed thereat. Then, at the following stage continuous sheet-printing device 10b, when the skip mark printed by the first stage is identified, a skip page can be inserted at the back side at the same location as at the front side.

In the above descriptions, skip pages are inserted when either of the two continuous sheet-printing devices 10a and 10b determines that generation of image data will not be timely for a print timing. However, even if both simultaneously determine that generation will not be timely, skip pages can be inserted in the same manner. In such a case, the larger of the numbers of insertion pages calculated by the continuous sheet-printing devices 10a and 10b is employed as the insertion page count.

As has been described hereabove, with the exemplary embodiments of the present invention, it is determined whether or not generation of image data by a generation section will be timely for print timings according to that image data, on the basis of buffering states of an output buffer, and when it is determined that the generation of image data will not be timely, skip pages are inserted to a predetermined number of pages between printed pages based on the image data. Therefore, even in a case in which generation of image data will not be timely for print timings of that image data, printing operations can be continued without stopping partway through printing.

Herein, the continuous sheet may be long belt-form sheet at which cutting lines such as perforations or the like or folding lines are formed at the respective pages and the pages can be cut apart, or may be long belt-form sheet which extends continuously without perforations or the like having been formed, and is not particularly limited.

Further, a determination section may determine whether or not generation of image data by the generation section will be timely for print timings according to that image data at a printing section on the basis of one or both of an image data holding amount of the output buffer and an amount of change in the image data holding amount over a predetermined period.

A rate when the image data is outputted to the output buffer and buffered over the predetermined time period (the registration rate of the image data) correlates with the above-mentioned amount of change. Therefore, instead of the amount of change of the image data holding amount over the predetermined time period, determinations may be based on the registration rate of the image data. Furthermore, an average rate of decrease of the buffer holding amount over the predetermined time period similarly correlates with the above-mentioned amount of change. Therefore, instead of the amount of change of the image data holding amount over the predetermined time period, the determinations may be based on the average rate of decrease.

If an insertion page count is excessively large, wastage of sheet will increase and desirable printing effects will not be provided. Therefore, if a calculated insertion page count is larger than a pre-specified number of pages, conveyance of the continuous sheet stops rather than insertion of skip pages being implemented, and printing operations of the printing section are suspended.

A controller may control the printing section such that identification information indicating the presence of skip pages is printed on the skip pages.

The controller may control the printing section so as to print a pattern for printing quality verification at the skip pages.

The foregoing description of the exemplary embodiments of the present invention has been provided for the purpose of illustration and description. It is not intended to be exhaustive or to limit the invention to the precise form disclosed herein. Obviously, many modifications and variations will be apparent to a practitioner skilled in the art. The exemplary embodiments were chosen and described in order to best explain the principles of the invention and its practical applications, thereby enabling others skilled in the art to understand the invention according to various embodiments and with various modifications as are suited to the particular use contemplated. It is intended that the scope of the invention be defined by the following claims and their equivalents.

What is claimed is:

1. A continuous sheet-printing device comprising:
    an input buffer that buffers printing data;
    a generation section that generates image data on the basis of printing data that is supplied from the input buffer;
    an output buffer that buffers the generated image data;
    a printing section that implements printing on continuous sheet in accordance with image data supplied from the output buffer;
    a determination section that determines, on the basis of a buffering state of the output buffer, whether or not generation of image data by the generation section will be timely for a print timing of that image data at the printing section; and
    a controller that, when the determination section determines that generation of image data by the generation section will not be timely, controls the printing section such that a predetermined page count of skip page(s) is inserted between printed pages according to the generated image data.

2. The continuous sheet-printing device of claim 1, wherein the determination section determines whether or not the generation of image data by the generation section will be timely for the print timing of that image data at the printing section on the basis of at least one of
    an image data holding amount of the output buffer or
    an amount of change of the image data holding amount over a predetermined period.

3. The continuous sheet-printing device of claim 1, wherein the controller calculates an insertion page count of the skip page(s) on the basis of a printing data holding amount of the input buffer, an image data holding amount of the output buffer, a buffering rate of image data into the output buffer and/or a printing speed of the printing section, and controls the printing section such that the calculated insertion page count of the skip page(s) is inserted.

4. The continuous sheet-printing device of claim 3, wherein, if the calculated insertion page count is larger than a pre-specified page count, the controller, rather than inserting the skip page, stops conveyance of the continuous sheet and stops printing operations of the printing section.

5. The continuous sheet-printing device of claim 1, wherein the controller controls the printing section such that identification information indicating the presence of the skip page(s) is printed at the skip page(s).

6. The continuous sheet-printing device of claim 1, wherein the controller controls the printing section such that a pattern for printing quality verification is printed at the skip page(s).

7. The continuous sheet-printing device of claim 1, wherein the determination section determines whether or not the generation of image data by the generation section will be timely for the print timing of that image data at the printing section on the basis of a buffering rate of image data into the output buffer.

8. The continuous sheet-printing device of claim 1, wherein the determination section determines whether or not the generation of image data by the generation section will be timely for the print timing of that image data at the printing section on the basis of an average rate of decrease of an image data holding amount of the output buffer.

9. The continuous sheet-printing device of claim 1, wherein the determination section checks a buffering state of the output buffer each time a predetermined amount of image data is buffered at the output buffer, and determines whether or not the generation of image data by the generation section will be timely for the print timing of that image data at the printing section.

10. The continuous sheet-printing device of claim 9, wherein, if an amount of change of an image data holding amount of the output buffer between a previous check of the buffering state and a current check of the buffering state, the determination section determines that the generation of image data by the generation section will not be timely for the print timing of that image data at the printing section.

11. The continuous sheet-printing device of claim 10, wherein the determination section determines that the generation of image data by the generation section will not be timely for the print timing of that image data at the printing section if in addition the image data holding amount of the output buffer is less than a predetermined threshold value.

12. A continuous sheet-printing system comprising: a plurality of printing devices arranged to be connected in series with one another; and a control device that controls each of the plurality of printing devices,
    the printing devices each comprising:
        an input buffer that buffers printing data;
        a generation section that generates image data on the basis of printing data that is supplied from the input buffer;
        an output buffer that buffers the image data;
        a printing section that implements printing on continuous sheet in accordance with image data supplied from the output buffer; and
        a determination section that determines, on the basis of a buffering state of the output buffer, whether or not generation of image data by the generation section will be timely for a print timing of that image data at the printing section,
    and the control device, when the determination section of at least one of the plurality of printing devices determines that the generation of image data by the generation section of that printing device will not be timely, controlling such that a predetermined page count of skip page(s) is inserted between printed pages according to the generated image data by each of the plurality of printing devices.

13. A method for controlling printing operations of a continuous sheet-printing device, the method comprising:
    buffering inputted printing data at an input buffer;
    generating image data on the basis of the printing data;
    buffering the generated image data at an output buffer;
    implementing printing on continuous sheet in accordance with image data from the output buffer;
    determining, on the basis of a buffering state of the output buffer, whether or not generation of image data will be timely for a print timing of that image data; and
    when it is determined that the generation of image data will not be timely, inserting a predetermined page count of skip page(s) between printed pages according to the generated image data.

14. The printing control method of claim 13, wherein the determining includes determining whether or not the generation of image data will be timely for the print timing of that image data on the basis of at least one of
    an image data holding amount of the output buffer or
    an amount of change of the image data holding amount over a predetermined period.

15. The printing control method of claim 13, wherein the inserting comprises calculating an insertion page count of the skip page(s) on the basis of a printing data holding amount of the input buffer, an image data holding amount of the output buffer, a buffering rate of image data into the output buffer, and/or a printing speed; and inserting the calculated insertion page count of the skip page(s).

16. The printing control method of claim 13, wherein the inserting comprises calculating an insertion page count of the skip page(s) on the basis of a printing data holding amount of the input buffer, an image data holding amount of the output buffer, a buffering rate of image data into the output buffer, and/or a printing speed; and, if the calculated insertion page count is larger than a pre-specified page count, stopping conveyance of the continuous sheet and stopping printing operations.

17. The printing control method of claim 13, further comprising printing identification information indicating the presence of the skip page(s) at the skip page(s).

18. The printing control method of claim 13, further comprising printing a pattern for printing quality verification at the skip page.

19. A method for controlling printing operations of a plurality of printing devices in a continuous sheet-printing system that includes the plurality of printing devices arranged to be connected in series with one another, the printing control method comprising, at each of the plurality of printing devices:

buffering printing data at an input buffer;

generating image data on the basis of the printing data;

buffering the image data at an output buffer;

implementing printing on continuous sheet in accordance with image data from the output buffer;

determining, on the basis of a buffering state of the output buffer, whether or not generation of image data will be timely for a print timing of that image data; and controlling such that, when it is determined at least one of the plurality of printing devices that the generation of image data will not be timely, a predetermined page count of skip page(s) is inserted between printed pages according to the generated image data at each of the plurality of printing devices.

20. A storage medium readable by a computer, the storage medium storing a program of instructions executable by the computer to perform processing for controlling printing operations of a continuous sheet-printing device, the processing comprising:

buffering inputted printing data at an input buffer;

generating image data on the basis of the printing data;

buffering the generated image data at an output buffer;

implementing printing on continuous sheet in accordance with image data from the output buffer;

determining, on the basis of a buffering state of the output buffer, whether or not generation of image data will be timely for a print timing of that image data; and when it is determined that the generation of image data will not be timely, inserting a predetermined page count of skip page(s) between printed pages according to the generated image data.

21. A storage medium readable by a computer, the storage medium storing a program of instructions executable by the computer to perform processing for controlling printing operations of a plurality of sheet printing devices in a continuous sheet-printing system that includes the plurality of printing devices arranged to be connected in series with one another, the processing comprising, for each of the plurality of printing devices:

buffering printing data at an input buffer;

generating image data on the basis of the printing data;

buffering the image data at an output buffer;

implementing printing on continuous sheet in accordance with image data from the output buffer;

determining, on the basis of a buffering state of the output buffer, whether or not generation of image data will be timely for a print timing of that image data; and controlling such that, when it is determined at least one of the plurality of printing devices that the generation of image data will not be timely, a predetermined page count of skip page(s) is inserted between printed pages according to the generated image data at each of the plurality of printing devices.

* * * * *